United States Patent
Yamauchi et al.

(10) Patent No.: US 10,230,105 B2
(45) Date of Patent: Mar. 12, 2019

(54) COBALT HYDROXIDE PARTICLES AND MANUFACTURING PROCESS THEREFOR AND POSITIVE ELECTRODE ACTIVE MATERIAL AND MANUFACTURING PROCESS THEREFOR

(71) Applicant: SUMITOMO METAL MINING CO., LTD., Tokyo (JP)

(72) Inventors: Mitsuru Yamauchi, Ehime (JP); Kazuomi Ryoshi, Ehime (JP); Shuzo Ozawa, Ehime (JP); Ryozo Ushio, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 369 days.

(21) Appl. No.: 15/038,543

(22) PCT Filed: Jan. 22, 2015

(86) PCT No.: PCT/JP2015/051671
§ 371 (c)(1),
(2) Date: May 23, 2016

(87) PCT Pub. No.: WO2015/118956
PCT Pub. Date: Aug. 13, 2015

(65) Prior Publication Data
US 2016/0308207 A1 Oct. 20, 2016

(30) Foreign Application Priority Data

Feb. 5, 2014 (JP) .................................. 2014-020578
Apr. 28, 2014 (JP) .................................. 2014-092601

(51) Int. Cl.
*H01M 4/525* (2010.01)
*C01G 51/04* (2006.01)
(Continued)

(52) U.S. Cl.
CPC ............ *H01M 4/525* (2013.01); *C01G 51/04* (2013.01); *C01G 51/42* (2013.01);
(Continued)

(58) Field of Classification Search
None
See application file for complete search history.

(56) References Cited

U.S. PATENT DOCUMENTS

2004/0213729 A1   10/2004 Suhara et al.

FOREIGN PATENT DOCUMENTS

JP   H09-22692 A    1/1997
JP   H10-265225 A   10/1998
(Continued)

OTHER PUBLICATIONS

Apr. 7, 2015 International Search Report issued in International Patent Application No. PCT/JP2015/051671.
(Continued)

*Primary Examiner* — Jonathan Crepeau
(74) *Attorney, Agent, or Firm* — Oliff PLC

(57) ABSTRACT

Obtaining cobalt hydroxide particles having a high filling property and a high density. The cobalt hydroxide particles used as a precursor for a positive electrode active material of a non-aqueous electrolyte secondary battery, including spherical secondary particles of flocculated primary particles, wherein average aspect ratio of the secondary particles is 0.7 or more, average particle diameter is 5 to 35 μm, and a value of (d90–d10)/MV indicating a dispersion of a particle size distribution is 0.6 or less, wherein, in sectional observation of the secondary particles, a ratio (N/L) of number (N) of gaps with maximum long diameter 0.3 μm or more recognized in particles of the secondary particles with sectional long diameter 3 μm or more to sectional long diameter (L) of the secondary particles is 1.0 or less, and (Continued)

also, maximum long diameter of the gaps is 15% or less of sectional long diameter of the secondary particles.

11 Claims, 2 Drawing Sheets

(51) Int. Cl.
 *C01G 51/00* (2006.01)
 *H01M 10/0525* (2010.01)
 *H01M 10/052* (2010.01)
 *H01M 4/02* (2006.01)

(52) U.S. Cl.
 CPC ..... *H01M 10/0525* (2013.01); *C01P 2004/03* (2013.01); *C01P 2004/32* (2013.01); *C01P 2004/50* (2013.01); *C01P 2004/51* (2013.01); *C01P 2004/53* (2013.01); *C01P 2004/54* (2013.01); *C01P 2004/61* (2013.01); *C01P 2006/11* (2013.01); *C01P 2006/40* (2013.01); *H01M 10/052* (2013.01); *H01M 2004/028* (2013.01)

(56) References Cited

FOREIGN PATENT DOCUMENTS

| | | |
|---|---|---|
| JP | H11-292549 A | 10/1999 |
| JP | 2001-354428 A | 12/2001 |
| JP | 2002-175804 A | 6/2002 |
| JP | 2003-503300 A | 1/2003 |
| JP | 2007-001809 A | 1/2007 |
| JP | 2010-116302 A | 5/2010 |
| JP | 2013-182758 A | 9/2013 |
| WO | 2004/023583 A1 | 3/2004 |

OTHER PUBLICATIONS

Jul. 5, 2017 Office Action issued in Japanese Patent Application No. 2014-092601.

COBALT HYDROXIDE PARTICLES AND MANUFACTURING PROCESS THEREFOR AND POSITIVE ELECTRODE ACTIVE MATERIAL AND MANUFACTURING PROCESS THEREFOR

BACKGROUND OF THE INVENTION

Field of the Invention

The present invention relates to a positive electrode active material used as a positive electrode material in a non-aqueous electrolyte secondary battery such as a lithium ion secondary battery, and manufacturing process therefor, and to cobalt hydroxide particles which serve as a precursor for the positive electrode active material, and a manufacturing process therefor. Concretely, it relates to a lithium-cobalt composite oxide used as a positive electrode active material of lithium ion secondary battery, and manufacturing process therefor, and to hydroxide particles which serve as a precursor for the lithium-cobalt composite oxide, and a manufacturing process therefor. The present application claims priority based on the Japanese Patent Application No. 2014-020578 filed on Feb. 5, 2014 and Japanese Patent Application No. 2014-092601 filed on Apr. 28, 2014 in Japan.

Description of Related Art

Recently, smaller and lighter secondary batteries which have high energy densities have been required with popularization of mobile devices such as cellular phones and laptop personal computers. Such batteries include lithium ion secondary batteries using lithium, lithium alloy, metal oxide or carbon as negative electrode, and which have been actively researched and developed.

The lithium ion secondary batteries using lithium composite oxides, especially, relatively easily synthesized lithium-cobalt composite oxides for the positive electrode materials can achieve high voltages on the order of 4 V grade, so it is expected as batteries with high energy density, and have been progressively put into practical use. The lithium-cobalt composite oxides have characteristics that it is having high filling property compared to the other positive electrode active materials such as lithium-nickel composite oxides and lithium-nickel-cobalt-manganese composite oxides.

Generally, in order to improve the filling property of the positive electrode active materials, it is effective to improve a sphericity of the particles to be the positive electrode active materials, to improve the density of the particles itself, to have a proper width in the particle size distribution, to enlarge the particle diameter in proper range, and else. Also, the filling property of the positive electrode active materials tends to reflect the filling property of oxide itself, such as cobalt oxide, or of hydroxide itself, such as cobalt hydroxide, used as precursors for the positive electrode active materials.

With respect to the powder characteristic of the above hydroxide or oxide, for example in Patent Document 1 (D1), a cobalt oxide powder, wherein a particle shape of a cobalt oxide is approximately spherical, and 50% particle diameter (D50) is 1.5 to 15 µm, D90 is twice of D50 or less, D10 is ⅕ of D50 or more, and also, a specific surface area is 2 to 15 m²/g, is disclosed.

Also, in Patent Document 2 (D2), oxy-cobalt hydroxide particles, wherein a tapping density is 2.3 g/cm³ or more, and also, it is approximately spherical, and further, average particle diameter is 5 µm to 15 µm, is disclosed.

Further, in Patent Document 3 (D3), hydroxides of an alloy formed from a cobalt hydroxide or cobalt and the other metal, having a density of approximately 0.5 to 2.2 g/cm³, a particle diameter over approximately 1 µm, typically of approximately 1 to 20 µm, and a specific surface area of approximately 0.5 to 20 m²/g, is disclosed.

However, it cannot be said that the comprehensive consideration of particle property is sufficient for the hydroxides or oxides described in D1 to D3, and it cannot be said that the filling property of the obtained positive electrode active materials such as lithium-cobalt composite oxides will be sufficient.

On the other hand, in Patent Document 4 (D4), hydroxide cobalt particles in the shape of hexagonal prism, wherein average particle diameter of a bottom surface is 1 to 30 µm, and also, average particle height is 0.2 to 10 µm, is disclosed, but such shape with low aspect ratio is disadvantageous for the improvement of the filing property.

Further, in Patent Document 5 (D5), a manufacturing process of cobalt hydroxides, wherein the cobalt hydroxides are obtained by controlling a pH value in a tank in the range of 11.0 to 13.5, by maintaining a supply salt concentration, a supply salt flow rate, and a temperature in the tank, by continuously supplying and stirring an aqueous solution of cobalt salt and a caustic alkali solution in a same tank, is disclosed. In such continuous process, a particle size distribution will be spread wide, and it is considered to be effective for the improvement of the filling property, but it is having a problem in improvement of a cycle characteristics, so it cannot be said that the consideration for the filling property is sufficient.

As mentioned above, it is necessary to improve the filling property of the cobalt hydroxide particles which are precursors for the lithium cobalt composite oxides, in order to improve the filling property of the lithium cobalt composite oxides. However, the cobalt hydroxide particles described in D1 to D5 cannot achieve the sufficient filling property. Therefore, further improvement of the filling property of the cobalt hydroxide particles which will be precursors for the positive electrode active materials is desired.

Patent Document 1: JP 2001-354428 A
Patent Document 2: JP 2007-001809 A
Patent Document 3: JP 2003-503300 A
Patent Document 4: JP 1411-292549 A
Patent Document 5: JP H09-022692 A

BRIEF SUMMARY OF THE INVENTION

Here, by considering such problem, the present invention is to provide cobalt hydroxide particles used as a precursor for a positive electrode active material of a non-aqueous electrolyte secondary battery and a manufacturing process therefor, wherein it is having a narrow particle size distribution and high sphericity, and further, a denseness of the particles itself is high, and a reaction with a lithium compound when obtaining the positive electrode active material is homogeneous. Further, the present invention is to provide a positive electrode active material of a non-aqueous electrolyte secondary battery and a manufacturing process therefor, wherein it is having a high filling property and able to achieve high coulomb efficiency.

The present inventors have found the knowledge that cobalt hydroxide particles having a narrow particle size distribution, a high sphericity and a high filling property can be achieved by separating a crystallization step for achieving hydroxide into a nucleation step for performing nucleation by controlling pH value and a particle growth step for growing particles, and also, by controlling atmosphere in a reaction vessel with a chlorine-containing cobalt aqueous solution as a raw material, as a result of diligently considering about a precursor enables a high filling property of a positive electrode active material for a non-aqueous electrolyte secondary battery, in order to solve the above problem. Further, the present inventors completed the present invention by finding the knowledge that a positive electrode active material for a non-aqueous electrolyte secondary battery having a high filling property and a high coulomb efficiency can be obtained as the reaction at the calcination progresses uniformly by mixing and calcining the obtained cobalt hydroxide particles with lithium compound.

Cobalt hydroxide particles relating to the present invention achieving the above purposes is the cobalt hydroxide particles used as a precursor for a positive electrode active material of a non-aqueous electrolyte secondary battery, comprising spherical secondary particles of flocculated primary particles, wherein average aspect ratio of the secondary particles is 0.7 or more, average particle diameter is 5 to 35 μm, and a value of (d90-d10)/MV indicating a dispersion of a particle size distribution is 0.6 or less, wherein, in sectional observation of the secondary particles, a ratio (N/L) of number (N) of gaps with maximum long diameter 0.3 μm or more recognized in particles of the secondary particles with sectional long diameter 3 μm or more to sectional long diameter (L) of the secondary particles is 1.0 or less, and also, maximum long diameter of the gaps is 15% or less of sectional long diameter of the secondary particles.

A manufacturing process of cobalt hydroxide particles relating to the present invention achieving the above purposes is a manufacturing process of the cobalt hydroxide particles used as a precursor for a positive electrode active material of a non-aqueous electrolyte secondary battery, comprising: a nucleation step for performing nucleation by supplying a chlorine-containing cobalt salt aqueous solution, an inorganic alkali aqueous solution and an ammonium ion-containing aqueous solution in a reaction vessel of non-oxidizing atmosphere to be a reaction solution, and by controlling pH value of the reaction solution on the basis of a liquid temperature of 25° C. to be 10.5 to 12.0; and a particle growth step for growing particles by controlling an aqueous solution for growing particles containing nuclei formed in the reaction solution in the nucleation step such that pH value on the basis of a liquid temperature of 25° C. will be 9.5 to 10.5 and also less than pH value in the nucleation step.

A positive electrode active material relating to the present invention achieving the above purposes is a positive electrode active material of a non-aqueous electrolyte secondary battery, which has been obtained with the cobalt hydroxide particles as a precursor, and comprising lithium cobalt composite oxide particles, wherein average particle diameter of the lithium cobalt composite oxide particles is 5 to 35 μm.

A manufacturing process of a positive electrode active material relating to the present invention achieving the above purposes is a manufacturing process of a positive electrode active material of a non-aqueous electrolyte secondary battery, comprising a mixing step for obtaining a lithium mixture by mixing the cobalt hydroxide particles and a lithium compound, and a calcining step for obtaining lithium cobalt composite oxides by calcining the lithium mixture in the oxidizing atmosphere.

The present invention can obtain the cobalt hydroxide particles having high denseness and high filling property appropriate as a precursor for a positive electrode active material of a non-aqueous electrolyte secondary battery. In addition, the present invention can obtain a positive electrode active material having high filling property succeeding the property of its cobalt hydroxide particles, by using the cobalt hydroxide particles having high denseness and high filling property as a precursor. Therefore, the present invention can increase positive electrode active materials filled per volume of the battery, and enables high capacity, and also, it is possible to obtain a non-aqueous electrolyte secondary battery having high coulomb efficiency. The cobalt hydroxide particles relating to the present invention is appropriate as a precursor for a positive electrode active material of a non-aqueous electrolyte secondary battery, and having significantly high industrial value.

DETAILED DESCRIPTION OF THE INVENTION

Figure 1:
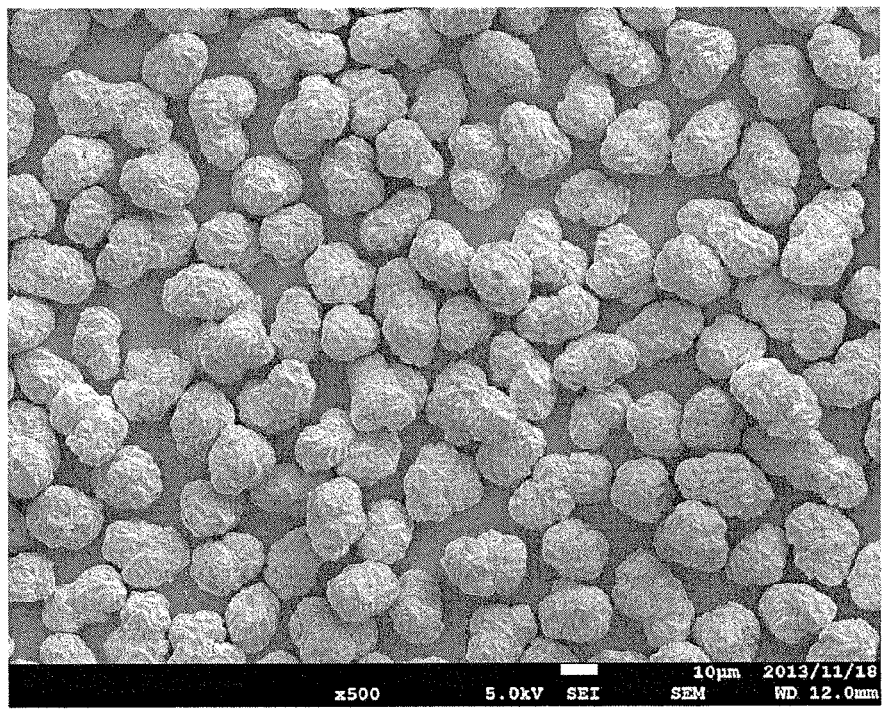
FIG. 1 is an appearance SEM image of cobalt hydroxide particles manufactured by example 1.

Hereinafter, explaining in details about cobalt hydroxide particles applying the present invention and a manufacturing process therefor, and a positive electrode active material using the cobalt hydroxide particles and a manufacturing process therefor. In addition, the present invention should not be limited to the following detailed description of the invention, unless limited specifically. The embodiments relating to the present invention will be explained in the following order.

1. Cobalt hydroxide particles
2. Manufacturing process of cobalt hydroxide particles
   2-1. Nucleation step
   2-2. Particle growth step
3. Manufacturing process of positive electrode active material
4. Positive electrode active material
5. Non-aqueous electrolyte secondary battery <1. Cobalt Hydroxide Particles>

Cobalt hydroxide particles relating to the embodiment of the present invention is a precursor for a positive electrode active material of a non-aqueous electrolyte secondary battery, especially a precursor for a positive electrode active material of a lithium-ion secondary battery.

The cobalt hydroxide particles comprise spherical secondary particles of flocculated primary particles, wherein average aspect ratio of the secondary particles is 0.7 or more, average particle diameter is 5 to 35 μm, a value of (d90-d10)/MV indicating a dispersion of a particle size distribution is 0.6 or less. Also, in the sectional observation of secondary particles, a ratio (N/L) of number (N) of gaps with maximum long diameter 0.3 μm or more recognized in a particle of secondary particles with sectional long diameter 3 μm or more to sectional long diameter (L) of the secondary particles is 1.0 or less, and also, maximum long diameter of the gaps is 15% or less of sectional long diameter of the secondary particles.

(Spherical Secondary Particles, Aspect Ratio)

The cobalt hydroxide particles comprise spherical secondary particles of flocculated primary particles, and average aspect ratio of the secondary particles is 0.7 or more. The cobalt hydroxide particles could have high filling property by making the shape of the secondary particles in spherical shape, and also by making its average aspect ratio as 0.7 or more. Also, the filling property of the cobalt hydroxide particles will be improved by making the shape of the secondary particles in spherical shape as the gaps between the particles will be inhibited. Here, the spherical shape includes elliptic shape or spherical shape with uneven particle surface.

Also, by making the aspect ratio of the secondary particles 0.7 or more, the gaps between the particles will be inhibited further, and the filling property will improve more. When the aspect ratio is less than 0.7, the sphericity of the secondary particle will be deteriorated, and the gaps between the particles will be increased, and the filling property of the cobalt hydroxide particles will be lowered.

The aspect ratio in each secondary particle can be found by measuring the ratio of maximum measured particle diameter to minimum measured particle diameter in the particle, determining the measured particle diameter as the distance of a point on the outer edge of the particle to another point on the outer edge which will be maximum length on the image of secondary particles in the observation of appearance of particles by scanning electronic microscope. Average aspect ratio is an average value of aspect ratio found for each secondary particle, and specifically, it can be obtained by optionally selecting 20 or more particles from the observation of appearance by scanning electronic microscope, and by obtaining number average of aspect ratio found for the 20 or more particles.

(Average Particle Diameter)

The average particle diameter of the cobalt hydroxide particles, i.e. secondary particles, is 5 to 35 µm, preferably 15 to 35 µm, more preferably, 25 to 35 µm. Here, the average particle diameter means MV (volume average particle diameter).

By making the average particle diameter 5 to 35 µm, it is possible to achieve high filling property and to improve uniformity of reaction between particles when mixing with lithium compound and calcining it. When the average particle diameter is less than 5 µm, the filling property of the cobalt hydroxide particles will be lowered. When the average particle diameter is more than 35 µm, the particle size distribution of the cobalt hydroxide particles will be spread, and the variance of reactivity with lithium compound will be large between the particles.

(Dispersion of Particle Size Distribution)

"(d90-d10)/MV" is an index indicating the spreading of particle size distribution of cobalt hydroxide particles. The value of (d90-d10)/MV of cobalt hydroxide particles is 0.6 or less, preferably 0.59 or less.

By making the value of (d90-d10)/MV of cobalt hydroxide particles 0.6 or less, it is possible to obtain a positive electrode active material having high coulomb efficiency which is possible to uniformize the reaction between the particles when mixing with the lithium compound and calcining it, and having high uniformity of the particle diameter by inhibiting the spreading of the particle size distribution of the cobalt hydroxide particles. On the other hand, when the value of (d90-d10)/MV is more than 0.6, not only it is not possible to achieve the uniformity of the reaction with lithium compound sufficiently, but also causes the problem of deterioration of cycling property by the increase of fine particles of the obtained positive electrode active material and the problem of short-circuit in a non-aqueous electrolyte secondary battery by the increase of coarse particles.

Here, d90 and d10 are particle diameters that respective volume cumulative distribution will be 90% and 10%. (d90-d10)/MV can obtain higher uniformity of particle diameter as the value is smaller, but considering the restriction of manufacturing, the minimum value of (d90-d10)/MV is in the order of 0.3 normally. In addition, d90, d10 and MV (volume average particle diameter) can be measured by laser diffraction scattering method using laser diffraction type particle size analyzer.

(N/L, Maximum Long Diameter of Gaps)

The cobalt hydroxide particles is having the feature that, in the sectional observation of secondary particles, a ratio (N/L) of number (N) of gaps with maximum long diameter 0.3 µm or more recognized in a particle of secondary particles with sectional long diameter 3 µm or more to sectional long diameter (L) of the secondary particles is 1.0 or less, and also, maximum long diameter of the gaps is 15% or less of sectional long diameter of the secondary particles.

The cobalt hydroxide particles will be having high denseness by the feature that a ratio (N/L) of number (N) of the gaps to sectional long diameter (L) of the secondary particles is 1.0 or less, and also, maximum long diameter of the gaps is 15% or less of sectional long diameter of the secondary particles. When the ratio N/L is more than 1.0 or when the maximum long diameter of the gaps is more than 15% of sectional long diameter of the secondary particles, the porosity in the particles will be high, and the denseness of the cobalt hydroxide particles will be lowered.

In addition, the gaps with maximum long diameter less than 0.3 µm is excluded as it is hard to determine precisely whether it is a gap or not, and also, as the effect for the denseness of the particles is little. Further, the particles with sectional long diameter less than 3 µM are excluded as the particles to measure the size or number of the gaps. This is because there is a possibility that the particles with sectional long diameter less than 3 µm is a section near the surface of the particle, as the sectional observation is a section at optional position of the particle. For such section near the surface, there is a possibility that the gaps in the particle cannot be evaluated precisely, as dents of particle surface could be observed as the gaps.

The sectional long diameter and the gap long diameter are the distance from a point on the outer edge of the particle or gap to another point on the outer edge which will be maximum length measured in the observation by the scanning electronic microscope. The maximum long diameter of the gap means the maximum gap long diameter in said gap.

Further, the maximum long diameter of the gap is preferably 2 µm or less. The maximum long diameter of the gaps of the cobalt hydroxide particles is 15% or less of the sectional long diameter of the secondary particles, but the allowed maximum long diameter of the gaps will be relatively large for the secondary particles having large particle diameter. Therefore, it is possible to make the denseness higher also for the particles having large particle diameter by the feature that the maximum long diameter of the gap is 2 µm or less.

(Tap Density)

The tap density of the cobalt hydroxide particles is preferably 2 to 3 g/mL. The filling property of the obtained positive electrode active material will be higher by selecting such cobalt hydroxide particles having high filling property as the raw material, and it is preferable as the electrode formed by using the positive electrode active material will be also having the higher filling density.

(Formation of Cobalt Hydroxide)

As the formation of the cobalt hydroxide, bivalent cobalt hydroxide illustrated as $Co(OH)_2$ is preferable, and it can be controlled easily to be the cobalt hydroxide particles of morphology improving the filling property. On the other hand, for trivalent cobalt salt such as $Co(OH)_3$ or CoOOH, it is difficult to control to be the cobalt hydroxide particles of morphology of high filling property, so it is not preferable.

It is possible to include, in the cobalt hydroxide particles, the element for improving the battery property when used in the battery as the positive electrode active material, which is normally added for improving the battery property. In addition, herein used "morphology" is a property relating to the structure and the figuration of the particles such as external form of particles, average aspect ratio, average particle diameter, index indicating the spreading of the particle size distribution, gaps in the particle, and tap density.

<2. Manufacturing Process of Cobalt Hydroxide Particles>

A manufacturing process of cobalt hydroxide particles comprising: a nucleation step for performing nucleation by supplying a chlorine-containing cobalt salt aqueous solution, an inorganic alkali aqueous solution and an ammonium ion-containing aqueous solution in a reaction vessel to be a reaction solution, while controlling the inside of the reaction vessel to a non-oxidizing atmosphere, and by controlling pH value of the reaction solution on the basis of a liquid temperature of 25° C. to be 10.5 to 12.0; and a particle growth step for growing particles by controlling an aqueous solution for growing particles containing nuclei formed in the reaction solution in the nucleation step such that pH value on the basis of a liquid temperature of 25° C. will be 9.5 to 10.5 and also less than pH value in the nucleation step.

(2-1. Nucleation Step)

In a nucleation step, nuclei of the cobalt hydroxide particles are generated by using chlorine-containing cobalt salt aqueous solution, inorganic alkali aqueous solution and ammonium ion-containing aqueous solution, while controlling inside of the reaction vessel in non-oxidizing atmosphere.

The secondary particles having high denseness can be obtained in the following particle growth step, by using chlorine-containing cobalt salt aqueous solution and by controlling inside of the reaction vessel in non-oxidizing atmosphere in the nucleation step. The lowering of the aspect ratio of the primary particles generated in the reaction solution is inhibited by the chlorine existing in the reaction solution, and the shape of the primary particles will be grown into pillar shape, rectangular parallelepiped or cube, and it is possible to inhibit the formation of many gaps by the development of the plate particle.

The chlorine-containing cobalt salt aqueous solution is one of the raw materials of the cobalt hydroxide particles, and it is preferable that molar ratio of the content of chlorine to the content of cobalt is 1 to 3, and more preferably 1.5 to 3. By making the molar ratio of the content of chlorine as 1 to 3, it is possible to improve the denseness of the cobalt hydroxide particles more.

When the molar ratio is less than 1, it is not possible to sufficiently achieve the effect to inhibit the lowering of aspect ratio of the primary particles, and the denseness could be lowered. On the other hand, when molar ratio is more than 3, excess amount of chlorine exist for bivalent cobalt ion, and there will be a lot of inorganic alkali necessary for neutralization, so excess amount of inorganic alkali could remain in the cobalt hydroxide particles.

As the chlorine-containing cobalt salt aqueous solution, it is possible to use an aqueous solution of cobalt chloride, and further, it is possible to use cobalt or cobalt compound dissolved in acid including chlorine such as hydrochloric acid. Also, the content of chlorine may be adjusted by adding hydrochloric acid and else to the chlorine-containing cobalt salt aqueous solution.

The concentration of the chlorine-containing cobalt salt aqueous solution is preferably 1 mol/L to 2.6 mol/L as cobalt, and more preferably 1.5 mol/L to 2.2 mol/L. When the concentration of chlorine-containing cobalt salt aqueous solution is less than 1 mol/L, the amount of crystallization per reaction vessel decreases, so the productivity will be lowered and it is not preferable. On the other hand, when salt concentration of the chlorine-containing cobalt salt aqueous solution is more than 2.6 mol/L, it will exceed the saturated concentration in normal temperature, so there is a risk that the pipes of the installation could be blocked by reprecipitation of crystal.

Further, in nucleation step, it will be possible to grow the primary particles while inhibiting the lowering of the aspect ratio of the primary particles further by including chlorine in the reaction solution and also by controlling the inside of the reaction vessel to non-oxidizing atmosphere, so it is possible to obtain the cobalt hydroxide particles having high denseness.

As the non-oxidizing atmosphere, an inert gas mixed atmosphere with oxygen concentration 5 volume % or less is preferable, and further, an inert gas mixed atmosphere with oxygen concentration 2 volume % or less is more preferable.

On the other hand, when the inside of the reaction vessel is controlled to oxidizing atmosphere, the shape of the cobalt hydroxide particles tend to be plate shaped, and also the primary particles will be refined, and the denseness of the cobalt hydroxide particles will be lowered. Also, in the oxidizing atmosphere, the growth of the secondary particles will be inhibited, so the average particle diameter will be small. As a controlling process of the atmosphere in the reaction vessel, a process for introducing the inert gas such as nitrogen gas and argon gas to the reaction vessel is preferable.

Concretely, in the nucleation step, chlorine-containing cobalt salt aqueous solution, inorganic alkali aqueous solution and ammonium ion-containing aqueous solution are supplied to the reaction vessel to be the reaction solution, while controlling the inside of the reaction vessel to non-oxidizing atmosphere. At this time, an additive element can be included in the chlorine-containing cobalt salt aqueous solution, or an aqueous solution including the additive element of salt can be supplied separately, and composition ratio of metal in the reaction solution will be same as the cobalt hydroxide particles.

Here, in the nucleation step, nuclei are generated by controlling the pH value of the reaction solution on the basis of a liquid temperature of 25° C. to 10.5 to 12.0. When the pH value is adjusted in the reaction vessel, fine nuclei of the cobalt hydroxide particles are generated. At this time, the pH value of the reaction solution is in the range of 10.5 to 12.0, so the generated nuclei will not grow mostly, and the generation of the nuclei will occur as priority. The adjustment of the pH value of the reaction solution is performed by adjusting the supply amount of the inorganic alkali aqueous solution, but it is not necessary to supply the inorganic alkali aqueous solution if the pH value of the reaction solution is adjusted to the above range by the supply of the ammonium ion-containing aqueous solution.

When the pH value is less than 10.5, flocculation of the nuclei will be inhibited, but the denseness of the particles to be the nuclei will be lowered as the aspect ratio of the primary particles forming the nuclei decreases, and also, the denseness of the cobalt hydroxide particles obtained via the particle growth step will be lowered. Also, when the pH value is less than 10.5, not only the nucleation, but also the particle growth occurs, so the uniformity of the particle diameter of the cobalt hydroxide particles will be lowered.

On the other hand, when the pH value is more than 12.0, the particles to be the nuclei will be in the plate shape as the flocculation between the particles will be significant, and the sphericity of the cobalt hydroxide particles obtained via the particle growth step will be deteriorated. Also, the particles to be the nuclei will be refined, so the denseness of the cobalt hydroxide particles will be lowered.

In the nucleation step, in order to facilitate the control of the nucleation more, it is possible to generate the nuclei by supplying the chlorine-containing cobalt salt aqueous solution to the aqueous solution with adjusted pH value and ammonium ion concentration, while maintaining these values.

(2-2. Particle Growth Step)

A particle growth step generates the cobalt hydroxide particles by growing the nuclei formed in the nucleation step. In the particle growth step, after the end of nucleation step, an aqueous solution for growing particles which is an reaction solution in the particle growth step is obtained by adjusting the pH value of the reaction solution including the nuclei formed in the nucleation step to 9.5 to 10.5 on the basis of a liquid temperature of 25° C., and also, by adjusting it to be lower than the pH value in the nucleation step. Concretely, the control of the pH value is performed by adjusting the supply amount of the inorganic alkali aqueous solution.

In the particle growth step, by making the pH value of the aqueous solution for growing the particles to the above range, the growing reaction of the nuclei occurs in preference to the generating reaction of the nuclei, so new nuclei will not be generated mostly in the aqueous solution for growing the particles, and the cobalt hydroxide particles having the predetermined particle diameter will be formed as the nuclei grow (particle growth).

When the pH value is more than 10.5, there will be many newly generated nuclei, and fine secondary particles will be formed, so it is not possible to obtain the cobalt hydroxide particles with favorable particle diameter distribution. Also, when the pH value is less than 9.5, the crystallization will be unstable, and the shape of the particles will be unstable. Also, when the pH value is less than 9.5, solubility by ammonium ion will be high and metal ion remaining in the solution without precipitation increases, so the production efficiency will be deteriorated.

In the particle growth step, the particles will be grew by supplying the chlorine-containing cobalt salt aqueous solution to the aqueous solution for growing the particles, but along with the particle growth by the supply of the chlorine-containing cobalt salt aqueous solution, the concentration of ammonium ion and the pH value of the aqueous solution for growing the particles changes. Therefore, in the particle growth step, the inorganic alkali aqueous solution and the ammonium ion-containing aqueous solution are also supplied to the aqueous solution for growing the particles, together with the chlorine-containing cobalt salt aqueous solution, and the pH value of the aqueous solution for growing the particles will be controlled to maintain the range of 9.5 to 10.5.

Then, when the cobalt hydroxide particles are grown until the predetermined particle diameter, the particle growth step will end. The particle diameter of the cobalt hydroxide particles could be determined easily from the supply amount of cobalt in each step, if the relation of the particle diameter of the obtained particles and the supply amount of cobalt to each reaction solution in each step of the nucleation step and the particle growth step were found by the preliminary experiment.

The particle diameter of the cobalt hydroxide particles can be controlled not only by the supply amount of cobalt, but also by the pH value of the nucleation step.

In other word, the supply amount of cobalt to be cast in is increased by making the pH value at the time of nucleation to higher pH value side, or by making the nucleation time longer, and the number of the nuclei to be generated is increased. Thanks to this feature, it is possible to make the particle diameter of the cobalt hydroxide particles small, even in the case that the particle growth step is set to the identical condition.

On the other hand, if it is controlled to reduce the number of nucleation, it is possible to increase the particle diameter of the obtained cobalt hydroxide particles.

Further, it is also possible to control the particle diameter by adjusting the amount of generation of the nuclei and the particle growth by adjusting the stirring of the reaction solution in each step of the nucleation step and the particle growth step. For example, during nucleation step, and in the beginning of the particle growth step, it is controlled to decrease the number of the growing particles by flocculating the nuclei or the particles at the beginning of growth by decreasing the stirring power in the reaction solution. In the following particle growth step, it is possible to obtain the cobalt hydroxide particles of large particle diameter by increasing the stirring power in the reaction solution to the extent that the particles do not flocculate and by growing the flocculated particles. In this case, after inhibiting the flocculation by increasing the stirring power, the number of the growing particles will not change, so it is possible to increase the particle diameter while maintaining the particle size distribution in narrow condition.

As the ammonium ion-containing aqueous solution to be used in the above nucleation step and particle growth step, it is not limited especially as long as the ammonia concentration of the reaction solution and the solution for growing particles can be controlled to be the predetermined concentration, and for example, it is possible to use an aqueous ammonia, and further, it is possible to use an aqueous solution such as ammonium sulfate, ammonium chloride, ammonium carbonate, and ammonium fluoride, accordingly.

The ammonia concentration of the reaction solution and the solution for growing particles is adjusted preferably to 5 g/L to 20 g/L, and more preferably to 7.5 g/L to 15 g/L. By adjusting the ammonia concentration to 5 g/L to 20 g/L, it is possible to obtain cobalt hydroxide particles having higher denseness. When the ammonia concentration is less than 5 g/L, the shape of the primary particles will be in plate shape, and the denseness may be lowered. On the other hand, when the ammonia concentration is more than 20 g/L, it will not be effective for the control of morphology, so a problem of high cost arises as the cost for chemicals or the cost for waste water treatment will be high.

As the inorganic alkali aqueous solution, it is not limited especially as long as the pH value of the reaction solution and the solution for growing particles can be controlled to be the predetermined numerical value, and for example, it is possible to use alkali metal hydroxide aqueous solution such as sodium hydroxide and potassium hydroxide accordingly.

The pH value and the ammonium ion concentration of the reaction solution and the solution for growing particles can be measured respectively by general pH meter and ion meter.

It is preferable to adjust the liquid temperature of the reaction solution and the solution for growing particles to 30° C. to 50° C., more preferably to 30° C. to 40° C. By adjusting it to 30° C. to 50° C., the cobalt hydroxide particles with stable particle size distribution and denseness can be obtained. When the liquid temperature of the reaction solution and the solution for growing particles is less than 30° C., the stable control of the crystallization may be difficult, so it is not preferable. On the other hand, when the liquid temperature is more than 50° C., the sphericity of the secondary particles will be lowered as the inhibition of the flocculation between the particles becomes insufficient, and also, the control of the particle diameter may be difficult as the complex formation ability of ammonia decreases, so it is not preferable.

In the above manufacturing process of the cobalt hydroxide particles, the nucleation will occur as priority and the growth of the nuclei will not occur mostly in the nucleation step. On the other hand, only the nucleus growth occurs and new nuclei will not be generated mostly in the particle growth step. Therefore, in the nucleation step, it is possible to form the nuclei with narrow and uniform particle size distribution range. Also, in the particle growth step, it is possible to grow the nuclei uniformly. Therefore, in the above manufacturing process of the cobalt hydroxide particles, it is possible to obtain the cobalt hydroxide particles with narrow and uniform particle size distribution range.

In addition, in the case of the above manufacturing process of the cobalt hydroxide particles, in both steps, cobalt ion will crystalize as nuclei or composite hydroxide particles, so the proportion of the liquid component for the metal component in each reaction solution will be increased. In this case, it looks as if the concentration of the supplied choline-containing cobalt salt aqueous solution has decreased, and there is a possibility that the cobalt hydroxide particles will not grow sufficiently, especially in the particle growth step.

Therefore, it is preferable to discharge a part of liquid component in the aqueous solution for growing particles to the outside of the reaction vessel after the end of the nucleation step and in the middle of the particle growth step, in order to inhibit the increase of the liquid component. Concretely, sedimenting the nuclei and the cobalt hydroxide particles by stopping the stirring and the supply of chlorine-containing cobalt salt aqueous solution, inorganic alkali aqueous solution, and ammonium ion-containing aqueous solution, and discharging the supernatant of the aqueous solution for growing particles. Thereby, it is possible to increase the relative concentration of the chlorine-containing cobalt salt aqueous solution in the aqueous solution for growing particles. In the particle growth step, the cobalt hydroxide particles can be grown in the condition that the relative concentration of the chlorine-containing cobalt salt aqueous solution is increased, so it is possible to make the particle size distribution of the cobalt hydroxide particles narrower, and it is also possible to increase the density of the cobalt hydroxide particles as a whole of the secondary particles.

Also, in the above manufacturing process of the cobalt hydroxide particles, it is performing the particle growth step following the nucleation step by forming the aqueous solution for growing the particles by adjusting the pH value of the reaction solution after the nucleation step, so there is an advantage that the transition to the particle growth step could be done rapidly. Further, there is an advantage that the transition from the nucleation step to the particle growth step can be transferred only by adjusting the pH value of the reaction solution, and the adjustment of the pH value can be performed easily by stopping the supply of the alkali aqueous solution temporarily. Also, if the amount of nuclei to be grown in the particle growth step is secured, it is possible to generate the nuclei by supplying the chlorine-containing cobalt salt aqueous solution and the ammonium ion-containing aqueous solution to the aqueous solution with the pH value and ammonium ion concentration being adjusted beforehand, and to continue the supply of chlorine-containing cobalt salt aqueous solution while maintaining the ammonium ion concentration, and to adjust the pH value to which of the particle growth step. In this case, it is not necessary to maintain the pH value in certain value by supplying inorganic alkali aqueous solution in the nucleation step, so the nucleation could be performed easier. In addition, the pH value of the reaction solution can be adjusted rapidly by adding the inorganic acid homogenous to the acid included in the chlorine-containing cobalt salt aqueous solution, for example hydrochloric acid, to the reaction solution.

Also, in the above manufacturing process of the cobalt hydroxide particles, the particle growth step is performed following the nucleation step, but it is not limited to this way, and it is possible to use the solution for growing particles different from the reaction solution after the nucleation step. Concretely, it is possible to form the component adjusted aqueous solution adjusted to the pH value and the ammonium ion concentration appropriate for the particle growth step, different from the reaction solution after the nucleation step, and to add the reaction solution including the nuclei generated by the nucleation step in another reaction vessel to this component adjusted aqueous solution to be the aqueous solution for growing particles, and to perform the particle growth step using this aqueous solution for growing particles.

In this case, the separation of the nucleation step and the particle growth step could be performed more surely, so the condition of the reaction solution in each step can be the most appropriate condition for each step. Especially, it is possible to make the pH value of the aqueous solution for growing particles in the most appropriate condition, from the time of beginning of the particle growth step. It is possible to make the particle size distribution range of the cobalt hydroxide particles formed in the particle growth step narrower and also uniform.

Also, in the above manufacturing process of the cobalt hydroxide particles, the cobalt hydroxide particles grown by the particle growth step is solid liquid separated, and treated with water washing and drying.

In the above manufacturing process of the cobalt hydroxide particles, the cobalt hydroxide particles comprising spherical secondary particles of flocculated primary particles, wherein average aspect ratio of the secondary particles is 0.7 or more, average particle diameter is 5 to 35 μm, a value of (d90-d10)/MV indicating a dispersion of a particle size distribution is 0.6 or less, and, in the sectional observation of secondary particles, a ratio (N/L) of number (N) of gaps with maximum long diameter 0.3 μm or more recognized in a particle of secondary particles with sectional long diameter 3 μm or more to sectional long diameter (L) of the secondary particles is 1.0 or less, and also, maximum long diameter of the gaps is 15% or less of sectional long diameter of the secondary particles, can be obtained. Therefore, in this manufacturing process of the cobalt hydroxide particles, it is possible to obtain the cobalt hydroxide particles suitable as a precursor for a positive electrode active material of a non-aqueous electrolyte secondary battery having high filling property and high denseness.

<3. Manufacturing Process of Positive Electrode Active Material>

In a manufacturing process of a positive electrode active material, the positive electrode active material of a non-aqueous electrolyte secondary battery is manufactured by using the above cobalt hydroxide particles as a precursor. For example, in the manufacturing process of the positive electrode active material, lithium cobalt composite oxide particles to be the positive electrode active material is obtained by mixing and calcining lithium compound and the above cobalt hydroxide particles, and by cracking it according to need.

Also, in the manufacturing process of the positive electrode active material, it is possible to generate cobalt oxide particles by heat treating the cobalt hydroxide particles in the oxidizing atmosphere, before mixing with lithium compound, and to mix said cobalt oxide particles with the lithium compound, in order to improve the generation of the lithium cobalt composite oxide particles.

As the manufacturing process of the cobalt oxide particles, the cobalt hydroxide particles are heated to 300° C. to 900° C., and it will be cobalt oxide particles by removing the moisture included in the cobalt hydroxide particles. The atmosphere for performing heat treatment is not limited specifically and it may be non-reducing atmosphere, but it is preferable to perform it in the air stream in which it could be performed easily. Also, the heat treatment time is not limited specifically, but there is a case that the removal of the excess moisture of the cobalt hydroxide particles may not be achieved sufficiently in less than one hour, so at least one hour or more is preferable, and 5 to 15 hours is more preferable.

In the manufacturing process of the positive electrode active material, the cobalt oxide particles obtained from said cobalt hydroxide particles will be the raw material, and the other manufacturing processes or conditions could be equivalent to the normal manufacturing process of the lithium cobalt composite oxide.

Concretely, in the manufacturing process of the positive electrode active material, the atmosphere at the calcination of the mixture of said cobalt hydroxide particles, or the cobalt oxide particles obtained by heat treating the cobalt hydroxide particles, and the lithium compound (Hereinafter referred to as "lithium cobalt mixture".) is adjusted to the oxidizing atmosphere, preferably to the air atmosphere.

The calcination of the lithium cobalt mixture is performed preferably at 650° C. to 990° C., more preferably at 750° C. to 980° C. Thereby, the diffusion of lithium to the cobalt hydroxide particles can be performed sufficiently, and it is possible to improve the crystal structure, and more superior battery property can be achieved, in the case that it is used in a non-aqueous electrolyte secondary battery.

When the calcining temperature is less than 650° C., the diffusion of the lithium to the cobalt hydroxide particles is not performed sufficiently, so there is a possibility that the sufficient battery property cannot be achieved in the case that it is used in the non-aqueous electrolyte secondary battery. Also, when the heat treatment temperature is more than 990° C., the intense sintering will occur between the particles, and also, there is a possibility that abnormal particle growth will occur, so there is a possibility that the battery property or the filling property will be lowered as the calcined particles become coarse.

When flocculation is acknowledged after the calcination, it is possible to improve the uniformity of the particle diameter by cracking.

By the above manufacturing process of the positive electrode active material, it is possible to manufacture the lithium cobalt composite oxide particles having high filing property by succeeding the morphology of the cobalt hydroxide particles with high filing property and high denseness, and having high coulomb efficiency as the reaction with the lithium compound is performed uniformly. The positive electrode active material comprising lithium cobalt composite oxide particles with high filling property and high coulomb efficiency is having a lot of amount to be filled per volume of the battery, and is favorable as the positive electrode active material adopted for the non-aqueous electrolyte secondary battery, and said battery shows high capacity when it is used in the positive electrode of the non-aqueous electrolyte secondary battery.

<4. Positive Electrode Active Material>

A positive electrode active material is the positive electrode active material for a non-aqueous electrolyte secondary battery obtained by the above manufacturing process of the positive electrode active material using the cobalt hydroxide particles. The positive electrode active material comprises, for example, lithium cobalt composite oxide particles. Average particle diameter of the lithium cobalt composite oxide particles is 5 μm to 35 μm, preferably 25 μm to 35 μm.

By controlling the range of average particle diameter to 5 μm to 35 μm, it will be having high filling property and high battery capacity when used for the non-aqueous electrolyte secondary battery. When average particle diameter is less than 5 μm, the filling property will be decreased, and it will not be able to achieve sufficient filling density, when the electrode of the non-aqueous electrolyte secondary battery is manufactured. On the other hand, when average particle diameter is more than 35 μm, the problem tend to arise that, when manufacturing the non-aqueous electrolyte secondary battery, the lithium cobalt composite oxide particles penetrate through the separator and causes short circuit. Further, it will be difficult to correspond to the thinning of the electrode for increasing the output of the non-aqueous electrolyte secondary battery.

The lithium cobalt composite oxide particles composing the positive electrode active material succeed the morphology of the cobalt hydroxide particles which is the raw material. Therefore, the value of (d90-d10)/MV, which is the index indicating the spreading of the particle size distribution, is preferably 0.6 or less. Thereby, the spreading of the particle size distribution of the positive electrode active material can be in the appropriate range, and it will be the positive electrode active material with high battery property.

When the value of (d90-d10)/MV is more than 0.6, the problem of the deterioration of the cycling property of the non-aqueous electrolyte secondary battery using the positive electrode arises by the increase of fine particles or the problem of the short circuit within the non-aqueous electrolyte secondary battery arises by the increase of coarse particles.

Also, the positive electrode active material comprises the above lithium cobalt composite oxide, and its composition can be indicated as $LiCoO_2$, and it may include the element normally added to improve the property of the non-aqueous electrolyte secondary battery. Also, in the positive electrode active material, it is preferable that the shape of the particles is spherical as the above cobalt hydroxide particles, in order to achieve the higher filling property.

Further, in the positive electrode active material, in the sectional observation of the lithium cobalt composite oxide particles, a ratio (N1/L) of number (N1) of gaps with maximum long diameter 0.3 μm or more recognized in a particle of lithium cobalt composite oxide particles with sectional long diameter 3 μm or more to sectional long diameter (L) of the lithium cobalt composite oxide particles is 0.5 or less, and a ratio (N2/L) of number (N2) of gaps with maximum long diameter 0.5 μm or more to sectional long diameter (L) of the lithium cobalt composite oxide particles is 0.2 or less, and also, maximum long diameter of the gaps is 25% or less of sectional long diameter of the lithium cobalt composite oxide particles. The positive electrode active material satisfying such conditions could achieve high filling property as the denseness of the particle itself is high. It is possible to achieve both filling property and battery property also in the positive electrode active material with narrow particle size distribution.

According to the above positive electrode active material, it is having high filling property as it succeeds the morphology regarding the secondary particles of the above cobalt hydroxide particles, so it is possible to improve the filling density of the positive electrode in non-aqueous electrolyte secondary battery, so it is preferable. Also, the above positive electrode active material is having high coulomb efficiency. As a result, it is possible to obtain a high capacity non-aqueous electrolyte secondary battery having positive electrode with high filling density. Therefore, the positive electrode active material is significantly useful for the positive electrode of the non-aqueous electrolyte secondary battery.

<5. Non-Aqueous Electrolyte Secondary Battery>

The above positive electrode active material can be used favorably as a positive electrode active material of a non-aqueous electrolyte secondary battery. Hereinafter, the embodiment when used for the non-aqueous electrolyte secondary battery is exemplified.

The non-aqueous electrolyte secondary battery is adopting the positive electrode using the above positive electrode active material. The non-aqueous electrolyte secondary battery is having a substantially similar structure with a general non-aqueous electrolyte secondary battery, except for it is using the above positive electrode active material to the positive electrode material, so it will be explained briefly.

The non-aqueous electrolyte secondary battery is having a structure comprising a case, and a positive electrode, a negative electrode, a non-aqueous electrolytic solution and a separator contained in this case.

The positive electrode is a sheet shaped member, and it can be formed by applying a positive electrode mixture paste containing the positive electrode active material to the surface of a current collector made of aluminum foil and drying the positive electrode mixture paste.

The positive electrode mixture paste is formed by adding a solvent to the positive electrode mixture and mixing it. The positive electrode mixture is formed by mixing the above positive electrode active material with a conductive material and a binding agent.

The conductive material is not limited specifically, but for example, graphite such as natural graphite, artificial graphite and expanded graphite, or a carbon black material such as acetylene black or Ketjen black can be used.

The binding agent used in the positive electrode mixture is not limited specifically, but for example, polyvinylidene fluoride (PVDF), polytetrafluoroethylene (PTFE), fluoro-rubber, ethylenepropylenedienerubber, styrenebutadien, cellulose resin, polyacrylic acid, and else can be used. In addition, active carbon may be added to the positive electrode mixture, and it is possible to increase the electric double layer capacity of the positive electrode, by adding the active carbon and else.

The solvent is not limited specifically, but for example, an organic solvent such as N-methyl-2-pyrolidone can be used.

The negative electrode is a sheet shaped member formed by applying a negative electrode mixture paste to the surface of a current collector made of metal foil such as copper and drying the negative electrode mixture paste.

The negative electrode active material can adopt a substance including lithium such as metal lithium or lithium alloy, or an occlusion substance which can occlude or desorb lithium ion.

The occlusion substance is not limited specifically, but for example, an organic compound calcined body such as natural graphite, artificial graphite and phenol resin, or a powder of carbon substance such as coke can be used.

As the separator, for example, a thin film such as polyethylene or polypropylene having numerous fine holes can be used. In addition, it is not limited specifically, as long as it is having a function of the separator.

The non-aqueous electrolyte solution is a solution dissolving lithium salt as supporting electrolyte in an organic solvent. As the organic solvent, one selected from a group of: an annular carbonate such as ethylene carbonate, propylene carbonate, butylene carbonate, and trifluoro propylene carbonate; a chain carbonate such as diethyl carbonate, dimethyl carbonate, ethyl methyl carbonate, and dipropyl carbonate; an ether compound such as tetrahydrofuran, 2-methyltetrahydrofuran, and dimethoxyethane; a sulfur compound such as ethyl methyl sulfone or butane sultone; a phosphorus compound such as triethyl phosphate or trioctyl phosphate, can be used solely or by mixing more than two selected from the group. As the supporting electrolyte, $LiPF_6$, $LiBF_4$, $LiClO_4$, $LiAsF_6$, $LiN(CF_3SO_2)_2$, and composite electrolyte thereof can be used.

The non-aqueous electrolyte secondary battery with the above structure is having the positive electrode using the above positive electrode active material, so it is possible to achieve high electrode density as the positive electrode active material is having high filling density. Thereby, in the non-aqueous electrolyte secondary battery, high initial discharge capacity and high coulomb efficiency can be achieved, and it will be high capacity. Also, the non-aqueous electrolyte secondary battery is having high volume energy density. Further, in the non-aqueous electrolyte secondary battery, there is no mixing of fine particles compared to a conventional positive electrode active material, so the cycling property is superior. Also, it is having high heat stability, so it is also superior in the safety.

EXAMPLES

The present invention is further explained in detail in below, by the examples and the comparative examples, but the present invention will not be limited in any way by these examples. The various evaluation methods in each example and each comparative example are as follow.

(1) Volume Average Particle Diameter and Particle Size Distribution Measurement

It was measured by using laser diffraction type particle size analyzer (Name of the Product: Microtrac, made by NIKKISO CO., LTD.).

(2) Average Aspect Ratio and Appearance of Particles

It was found by observing the appearance of the particles by the scanning electronic microscope (SEM, Name of Product: S-4700, made by Hitachi High-Technologies Corporation), and by calculating the average value from the measured values of the optionally selected 20 particles.

(3) Denseness

It was evaluated by observing the section of the particles in 1000 magnifications by using scanning electronic microscope (SEM, Name of Product: S-4700, made by Hitachi High-Technologies Corporation), and by selecting the particle which was able to observe the entire section, and by measuring the maximum long diameter of the gap and the sectional long diameter.

(4) Analysis of Metal Component

It was analyzed by ICP emission spectroscopy (ICP: Inductively Coupled Plasma), after dissolving the sample.

(5) Identification of Crystal Structure

It was identified by using the X ray diffraction pattern obtained by the X ray diffraction measurement device (X'Pert Pro, made by PANalytical B.V.)

(6) Evaluation of Battery

The evaluation about the initial capacity was performed by 2032 type coin battery configured by using the obtained positive electrode active material. Concretely, 20 mass % of acetylene black and 10 mass % of PTFE were added and mixed to 70 mass % of positive electrode active material powder, and 150 mg was weighed and a pellet was produced as the positive electrode. Also, as the negative electrode, lithium metal was used, and as the electrolytic solution, equally mixed solution (made by FUJI CHEMICALS INDUSTRIAL CO., LTD) of ethylene carbonate (EC) and diethyl carbonate (DEC) having 1M of $LiClO_4$ as supporting electrolyte was used, and 2032 type coin battery was produced in the globe box of Ar atmosphere with dew point being controlled to −80° C.

The produced coin battery was left for about 24 hours, and after the Open Circuit Voltage (OCV) became stabled, the current density against the positive electrode was set to 0.5 $mA/cm^2$ and charged until cutoff voltage 4.4 V to be the initial charging capacity, and after one hour of rest, the capacity when discharged until cutoff voltage 3.0 V was set to the initial discharge capacity. From these values, coulomb efficiency [discharge capacity/charging capacity*100(%)] was found.

Example 1

1.4 L of pure water and 90 mL of 25 mass % ammonia water were injected into crystallization reaction vessel with vessel volume of 5 L attached with four baffle plates, and it was heated to 40° C. by thermostatic tank and heating jacket, and 25 mass % sodium hydroxide aqueous solution was added, and the pH of the reaction solution in the reaction vessel was adjusted to 11.5 on the basis of 25° C. Nitrogen gas was supplied into reaction vessel at 3 L/min, and the oxygen concentration in the reaction vessel was controlled to 1 volume % or less.

The crystallization reaction of the nucleation step was performed by controlling the pH to be 11.5 on the basis of 25° C., by adding 25 mass % sodium hydroxide aqueous solution intermittently, while supplying cobalt chloride aqueous solution, with cobalt molar concentration of 1.2 mol/L, at 5 mL/min, and also supplying 25 mass % ammonia water at 0.8 mL/min, by using quantitative pump, and while stirring the reaction solution at 600 rpm by using disk turbine type stirring blade. After the regulated amount of reaction had ended, the pH of the reaction solution was adjusted to 10.0 on the basis of 25° C. by injecting the appropriate amount of 35 mass % hydrochloric acid.

The crystallization reaction of the particle growth step was performed by controlling the pH of the reaction solution to be 10.0 on the basis of 25° C., by adding cobalt chloride aqueous solution, ammonia water and sodium hydroxide aqueous solution as well as the nucleation step by using quantitative pump, while stirring the reaction solution (aqueous solution for growing particles) at 600 rpm by using disk turbine type stirring blade.

The chlorine content in the cobalt chloride aqueous solution was 2.1 by molar ratio to cobalt. The ammonia concentration in the solution was 15 g/L. The particle growth step was performed for 8 hours, and slurry including the obtained cobalt hydroxide particles was solid liquid separated, washed with water and dried to obtain the powdery cobalt hydroxide.

The secondary particle shape of the obtained cobalt hydroxide particles was spherical, and average particle diameter of the secondary particles was 21.3 μm, and average aspect ratio of the secondary particles was 0.79, and (d90-d10)/MV=0.51. Also, it was confirmed that the crystal structure was cobalt hydroxide indicated by $Co(OH)_2$. Tap density was measured, and it was 2.2 g/mL.

Figure 2:
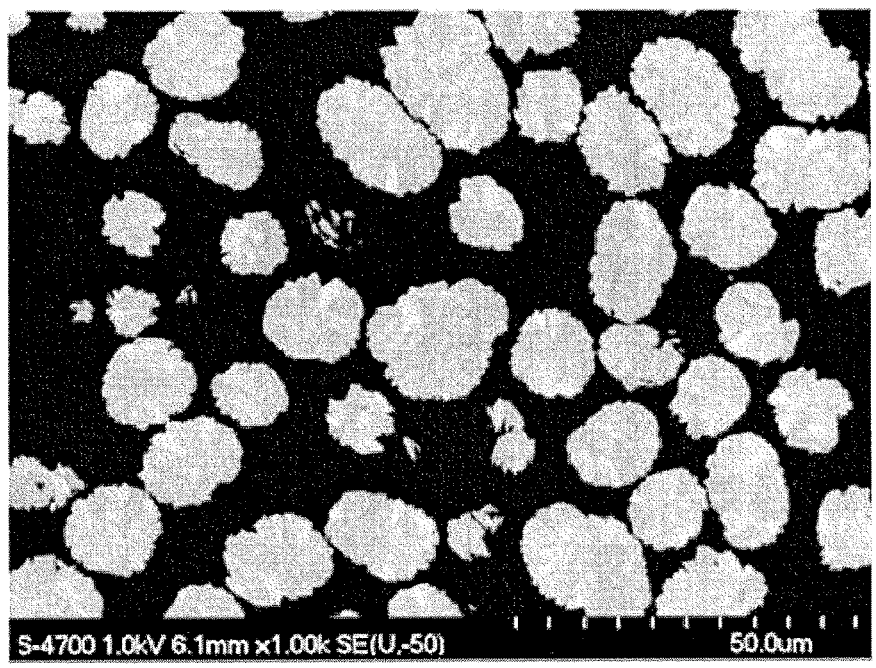
FIG. 2 is a sectional SEM image of cobalt hydroxide particles manufactured by example 1.

The appearance SEM image of the obtained cobalt hydroxide was illustrated in FIG. 1 and the sectional SEM image was illustrated in FIG. 2. The denseness of the secondary particles was evaluated from the sectional SEM image, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles. The maximum long diameter of the gap was 1.6 μm.

Example 2

The cobalt hydroxide particles were obtained and evaluated as well as the example 1, except that the pH of the reaction solution was adjusted to 10.8 on the basis of 25° C. in the nucleation step.

The secondary particle shape of the obtained cobalt hydroxide particles was spherical, and average particle diameter of the secondary particles was 22.4 μm, and average aspect ratio of the secondary particles was 0.77, and (d90-d10)/MV=0.53. Also, it was confirmed that the crystal structure was cobalt hydroxide indicated by $Co(OH)_2$. Tap density was measured, and it was 2.0 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 3

The cobalt hydroxide particles were obtained and evaluated as well as the example 1, except that the pH of the reaction solution was adjusted to 11.8 on the basis of 25° C. in the nucleation step.

The secondary particle shape of the obtained cobalt hydroxide particles was spherical, and average particle diameter of the secondary particles was 20.3 μm, and average aspect ratio of the secondary particles was 0.71, and (d90-d10)/MV=0.54. Also, it was confirmed that the crystal structure was cobalt hydroxide indicated by $Co(OH)_2$. Tap density was measured, and it was 2.0 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 4

The cobalt hydroxide particles were obtained and evaluated as well as the example 1, except that the pH of the reaction solution was adjusted to 9.7 on the basis of 25° C. in the particle growth step.

The secondary particle shape of the obtained cobalt hydroxide particles was spherical, and average particle diameter of the secondary particles was 23.2 μm, and average aspect ratio of the secondary particles was 0.78, and (d90-d10)/MV=0.50. Also, it was confirmed that the crystal structure was cobalt hydroxide indicated by $Co(OH)_2$. Tap density was measured, and it was 2.0 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 5

The cobalt hydroxide particles were obtained and evaluated as well as the example 1, except that the pH of the reaction solution was adjusted to 10.3 on the basis of 25° C. in the particle growth step.

The secondary particle shape of the obtained cobalt hydroxide particles was spherical, and average particle diameter of the secondary particles was 22.9 μm, and average aspect ratio of the secondary particles was 0.71, and (d90-d10)/MV=0.58. Also, it was confirmed that the crystal structure was cobalt hydroxide indicated by $Co(OH)_2$. Tap density was measured, and it was 2.0 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 6

The cobalt hydroxide particles were obtained and evaluated as well as the example 1, except that the mixture of cobalt chloride and cobalt sulfate was used as the cobalt raw material, and that chlorine content in cobalt aqueous solution was adjusted to 0.5 by molar ratio to cobalt.

The secondary particle shape of the obtained cobalt hydroxide particles was spherical, and average particle diameter of the secondary particles was 18.2 μm, and average aspect ratio of the secondary particles was 0.73, and (d90-d10)/MV=0.57. Also, it was confirmed that the crystal structure was cobalt hydroxide indicated by $Co(OH)_2$. Tap density was measured, and it was 2.0 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 7

The cobalt hydroxide particles were obtained and evaluated as well as the example 1, except that the temperature of the reaction solution was controlled to 50° C.

The secondary particle shape of the obtained cobalt hydroxide particles was spherical, and average particle diameter of the secondary particles was 22.8 μm, and average aspect ratio of the secondary particles was 0.71, and (d90-d10)/MV=0.58. Also, it was confirmed that the crystal structure was cobalt hydroxide indicated by $Co(OH)_2$. Tap density was measured, and it was 2.1 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 8

The cobalt hydroxide particles were obtained and evaluated as well as the example 1, except that the ammonium ion concentration in the reaction solution was adjusted to 7.5 g/L.

The secondary particle shape of the obtained cobalt hydroxide particles was spherical, and average particle diameter of the secondary particles was 19.2 and average aspect ratio of the secondary particles was 0.74, and (d90-d10)/MV=0.58. Also, it was confirmed that the crystal structure was cobalt hydroxide indicated by $Co(OH)_2$. Tap density was measured, and it was 2.0 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 9

The cobalt hydroxide particles were obtained and evaluated as well as the example 1, except that the ammonium ion concentration in the reaction solution was adjusted to 18 g/L.

The secondary particle shape of the obtained cobalt hydroxide particles was spherical, and average particle diameter of the secondary particles was 21.5 and average aspect ratio of the secondary particles was 0.81, and (d90-d10)/MV=0.49. Also, it was confirmed that the crystal structure was cobalt hydroxide indicated by $Co(OH)_2$. Tap density was measured, and it was 2.3 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Example 10

The cobalt hydroxide particles were obtained and evaluated as well as the example 1, except that the number of rotations of the stirring was adjusted to 300 rpm during the nucleation step and only during starting 30 minutes of the particle growth step.

The secondary particle shape of the obtained cobalt hydroxide particles was spherical, and average particle diameter of the secondary particles was 31.1 μm, and average aspect ratio of the secondary particles was 0.74, and (d90-d10)/MV=0.53. Also, it was confirmed that the crystal structure was cobalt hydroxide indicated by $Co(OH)_2$. Tap density was measured, and it was 2.3 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Comparative Example 1

3 L of pure water and 140 mL of 25 mass % ammonia water were injected into the overflow type crystallization reaction vessel with vessel volume of 6 L attached with four baffle plates, and it was heated to 60° C. by thermostatic tank and heating jacket, and 25 mass % sodium hydroxide aqueous solution was added, and the pH of the reaction solution in the reaction vessel was adjusted to 11.4 on the basis of 25° C. Nitrogen gas was supplied into reaction vessel at 3 L/min, and the oxygen concentration in the reaction vessel was controlled to 1 volume % or less.

The crystallization reaction of the nucleation step was performed by controlling the pH to be 11.4 on the basis of 25° C., by adding 25 mass % sodium hydroxide aqueous solution intermittently, while supplying cobalt chloride aqueous solution, with cobalt molar concentration of 1.2 mol/L, at 10 mL/min, and also supplying 25 mass % ammonia water at 1.5 mL/min, by using quantitative pump, and while stirring the reaction solution kept at 60° C. The chlorine content in cobalt chloride aqueous solution was 2.1 by molar ratio to cobalt. Also, the ammonia concentration in the reaction solution was 10 g/L.

The generated cobalt hydroxide particles were continuously removed by overflow, and it was solid liquid separated, washed with water, and dried accordingly to obtain the powdery cobalt hydroxide.

The secondary particle shape of the cobalt hydroxide particles removed over 48 to 72 hours from the start of the reaction was spherical, and average particle diameter of the secondary particles was 24.3 μm, and average aspect ratio of the secondary particles was 0.69, and (d90-d10)/MV=0.96. Also, it was confirmed that the crystal structure was cobalt hydroxide indicated by $Co(OH)_2$. Tap density was measured, and it was 2.2 g/mL.

Further, the denseness of the secondary particles was evaluated, and in the particles with the sectional long diameter of the secondary particles was 3 μm or more by observing the entire section, it was confirmed that N/L confirmed in the observed particles was 1.0 or less, and also, the maximum long diameter of the gaps was 15% or less of the sectional long diameter of the secondary particles.

Comparative Example 2

The cobalt hydroxide particles were obtained and evaluated as well as the example 1, except that the pH of the reaction solution was adjusted to 10.3 on the basis of 25° C. in the nucleation step.

The secondary particle shape of the obtained cobalt hydroxide particles was spherical, and average particle diameter of the secondary particles was 21.8 μm, and average aspect ratio of the secondary particles was 0.79, and (d90-d10)/MV=0.51. Also, it was confirmed that the crystal structure was cobalt hydroxide indicated by $Co(OH)_2$. Tap density was measured, and it was 1.8 g/mL.

Further, the denseness of the secondary particles was evaluated, and in the particles with the sectional long diameter of the secondary particles was 3 μm or more by observing the entire section, N/L confirmed in the observed particles was 2.1 at maximum, and also, the maximum long diameter of the gaps was 23% of the sectional long diameter of the secondary particles. Also, it was confirmed that the maximum long diameter of the gaps was 4.1 μm, and that there were many gaps in the particle, and that it was having low denseness.

Comparative Example 3

The cobalt hydroxide particles were obtained and evaluated as well as the example 1, except that the pH of the reaction solution was adjusted to 12.5 on the basis of 25° C. in the nucleation step.

The secondary particle shape of the obtained cobalt hydroxide particles was undefined shape, and average particle diameter of the secondary particles was 20.5 μm, and average aspect ratio of the secondary particles was 0.59, and (d90-d10)/MV=0.71. Also, it was confirmed that the crystal structure was cobalt hydroxide indicated by $Co(OH)_2$. Tap density was measured, and it was 1.7 g/mL.

Further, the denseness of the secondary particles was evaluated, and in the particles with the sectional long diameter of the secondary particles was 3 μm or more by observing the entire section, N/L confirmed in the observed particles was 1.3 at maximum, and also, the maximum long diameter of the gaps was 19% of the sectional long diameter of the secondary particles. Also, it was confirmed that the maximum long diameter of the gaps was 2.6 μm, and that there were many gaps in the particle, and that it was having low denseness.

Comparative Example 4

The cobalt hydroxide particles were obtained and evaluated as well as the example 1, except that the pH of the reaction solution was adjusted to 9.0 on the basis of 25° C. in the particle growth step.

The secondary particle shape of the obtained cobalt hydroxide particles was undefined shape, and average particle diameter of the secondary particles was 10.8 μm, and average aspect ratio of the secondary particles was 0.50, and (d90-d10)/MV=0.89. Also, it was confirmed that the crystal structure was cobalt hydroxide indicated by $Co(OH)_2$. Tap density was measured, and it was 1.4 g/mL.

Further, the denseness of the secondary particles was evaluated, and in the particles with the sectional long diameter of the secondary particles was 3 μm or more by observing the entire section, N/L confirmed in the observed particles was 1.2 at maximum, and also, the maximum long diameter of the gaps was 18% of the sectional long diameter of the secondary particles. Also, it was confirmed that the maximum long diameter of the gaps was 2.8 µm, and that there were many gaps in the particle, and that it was having low denseness.

Comparative Example 5

The cobalt hydroxide particles were obtained and evaluated as well as the example 1, except that the pH of the reaction solution was adjusted to 11.0 on the basis of 25° C. in the particle growth step.

The secondary particle shape of the obtained cobalt hydroxide particles was undefined shape, and average particle diameter of the secondary particles was 17.5 µm, and average aspect ratio of the secondary particles was 0.49, and (d90-d10)/MV=0.91. Also, it was confirmed that the crystal structure was cobalt hydroxide indicated by $Co(OH)_2$. Tap density was measured, and it was 1.6 g/mL.

Further, the denseness of the secondary particles was evaluated, and in the particles with the sectional long diameter of the secondary particles was 3 µm or more by observing the entire section, N/L confirmed in the observed particles was 1.1 at maximum, and also, the maximum long diameter of the gaps was 17% of the sectional long diameter of the secondary particles. Also, it was confirmed that the maximum long diameter of the gaps was 2.3 µm, and that there were many gaps in the particle, and that it was having low denseness.

Comparative Example 6

The cobalt hydroxide particles were obtained and evaluated as well as the example 1, except that cobalt sulfate was used as cobalt salt, and that the chlorine content in the cobalt aqueous solution was adjusted to 0.

The secondary particle shape of the obtained cobalt hydroxide particles was undefined shape, and average particle diameter of the secondary particles was 18.4 µm, and average aspect ratio of the secondary particles was 0.54, and (d90-d10)/MV=0.73. Also, it was confirmed that the crystal structure was cobalt hydroxide indicated by $Co(OH)_2$. Tap density was measured, and it was 1.8 g/mL.

Further, the denseness of the secondary particles was evaluated, and in the particles with the sectional long diameter of the secondary particles was 3 µM or more by observing the entire section, N/L confirmed in the observed particles was 3.8 at maximum, and also, the maximum long diameter of the gaps was 22% of the sectional long diameter of the secondary particles. Also, it was confirmed that the maximum long diameter of the gaps was 3.1 and that there were many gaps in the particle, and that it was having low denseness.

Comparative Example 7

The cobalt hydroxide particles were obtained and evaluated as well as the example 1, except that the ammonia concentration in the reaction solution was adjusted to 3 g/L.

The secondary particle shape of the obtained cobalt hydroxide particles was spherical, and average particle diameter of the secondary particles was 18.3 µm, and average aspect ratio of the secondary particles was 0.61, and (d90-d10)/MV=0.52. Also, it was confirmed that the crystal structure was cobalt hydroxide indicated by $Co(OH)_2$. Tap density was measured, and it was 1.8 g/mL.

Further, the denseness of the secondary particles was evaluated, and in the particles with the sectional long diameter of the secondary particles was 3 µm or more by observing the entire section, N/L confirmed in the observed particles was 3.1 at maximum, and also, the maximum long diameter of the gaps was 21% of the sectional long diameter of the secondary particles. Also, it was confirmed that the maximum long diameter of the gaps was 2.9 µm, and that there were many gaps in the particle, and that it was having low denseness.

Comparative Example 8

The cobalt hydroxide particles were obtained and evaluated as well as the example 1, except that the nitrogen gas was not supplied into the reaction vessel.

The secondary particle shape of the obtained cobalt hydroxide particles was undefined shape, and average particle diameter of the secondary particles was 12.3 µm, and average aspect ratio of the secondary particles was 0.49, and (d90-d10)/MV=1.27. Also, it was confirmed that the crystal structure was oxy-cobalt hydroxide with trivalent cobalt indicated by CoOOH. Tap density was measured, and it was 1.1 g/mL.

Further, the denseness of the secondary particles was evaluated, and in the particles with the sectional long diameter of the secondary particles was 3 µm or more by observing the entire section, N/L confirmed in the observed particles was 4.5 at maximum, and also, the maximum long diameter of the gaps was 36% of the sectional long diameter of the secondary particles. Also, it was confirmed that the maximum long diameter of the gaps was 3.7 µm, and that there were many gaps in the particle, and that it was having low denseness.

Figure 3:
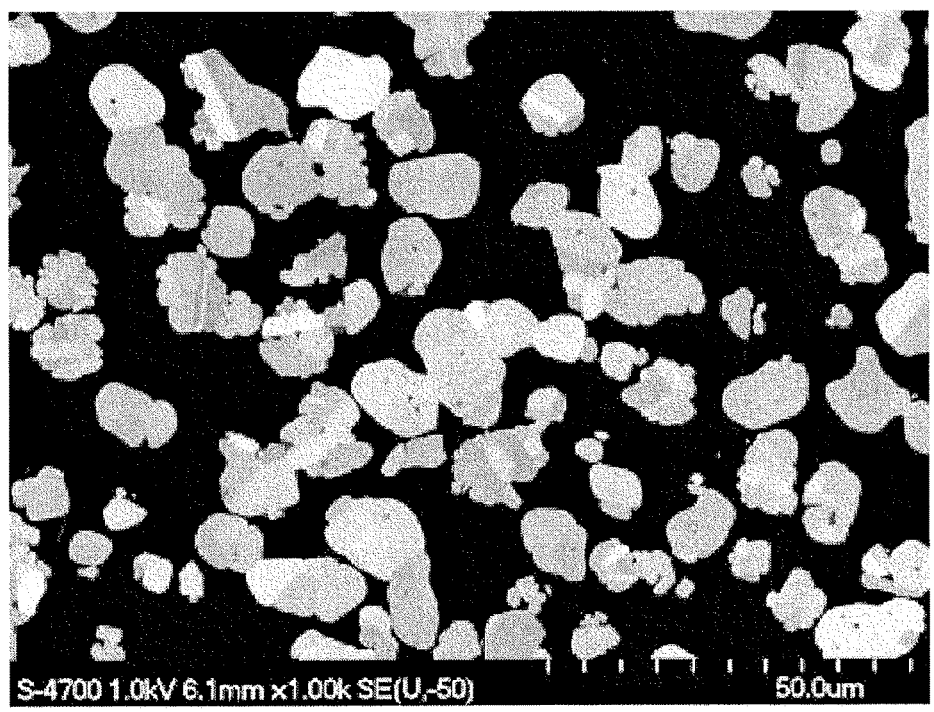
FIG. 3 is a sectional SEM image of a positive electrode active material manufactured by example 1.

Next, the positive electrode active material and the battery were made by using cobalt hydroxide particles respectively obtained by the above examples 1 to 9 and the above comparative examples 1 to 8 and they were evaluated. The cobalt hydroxide particles were mixed with lithium carbonate such that molar ratio of lithium to cobalt (Li/Co) was set to 1.01, and calcined for 10 hours at 1000° C. in the air stream. After cooling, it was cracked to obtain the positive electrode active material. In every sample, it was confirmed that the crystal structure of the obtained positive electrode active material was layer shaped compound indicated by $LiCoO_2$. Tap density of each particle was measured. Also, as the evaluation of the positive electrode active material for non-aqueous electrolyte secondary battery, the coin type battery was produced and initial discharge capacity and coulomb efficiency were measured. In addition, sectional SEM image of the positive electrode active material obtained by using cobalt hydroxide particles of the example 1 is illustrated in FIG. 3.

In below Table 1, the evaluation results of the cobalt hydroxide particles, positive electrode active material and battery are indicated.

TABLE 1

| | Precursor | | | | Active Material | | |
|---|---|---|---|---|---|---|---|
| | Secondary Particle | | | | | | |
| | Average Particle Diameter (μm) | Secondary Particle Aspect Ratio | (d90 − d10)/ MV | Tap Density (g/mL) | Tap Density (g/mL) | Initial Discharge Capacity (mAh/g) | Coulomb Efficiency (%) |
| Example 1 | 21.3 | 0.79 | 0.51 | 2.2 | 2.4 | 174 | 96.5 |
| Example 2 | 22.4 | 0.77 | 0.53 | 2.0 | 2.1 | 174 | 96.4 |
| Example 3 | 20.3 | 0.71 | 0.54 | 2.0 | 2.2 | 172 | 95.9 |
| Example 4 | 23.2 | 0.78 | 0.50 | 2.0 | 2.1 | 172 | 96.4 |
| Example 5 | 22.9 | 0.71 | 0.58 | 2.0 | 2.2 | 174 | 96.1 |
| Example 6 | 18.2 | 0.73 | 0.57 | 2.0 | 2.1 | 173 | 96.0 |
| Example 7 | 22.8 | 0.71 | 0.58 | 2.1 | 2.3 | 174 | 96.2 |
| Example 8 | 19.2 | 0.74 | 0.58 | 2.0 | 2.2 | 173 | 96.1 |
| Example 9 | 21.5 | 0.81 | 0.49 | 2.3 | 2.5 | 174 | 96.7 |
| Example 10 | 31.1 | 0.74 | 0.53 | 2.3 | 2.5 | 174 | 96.5 |
| Comparative Example 1 | 24.3 | 0.69 | 0.96 | 2.2 | 2.3 | 173 | 95.1 |
| Comparative Example 2 | 21.8 | 0.79 | 0.51 | 1.8 | 1.9 | 172 | 95.3 |
| Comparative Example 3 | 20.5 | 0.59 | 0.71 | 1.7 | 1.9 | 172 | 95.0 |
| Comparative Example 4 | 10.8 | 0.50 | 0.89 | 1.4 | 1.6 | 169 | 94.7 |
| Comparative Example 5 | 17.5 | 0.49 | 0.91 | 1.6 | 1.7 | 171 | 95.1 |
| Comparative Example 6 | 18.4 | 0.54 | 0.73 | 1.8 | 1.9 | 170 | 94.5 |
| Comparative Example 7 | 18.3 | 0.61 | 0.52 | 1.8 | 1.9 | 171 | 94.9 |
| Comparative Example 8 | 12.3 | 0.49 | 1.27 | 1.1 | 1.4 | 170 | 94.2 |

From the results indicated in Table 1, as indicated in the examples 1 to 10, it was confirmed that the positive electrode active material obtained by using the cobalt hydroxide particles applying the present invention was having high filling property, high initial discharge capacity and high coulomb efficiency. On the other hands, the comparative examples 1 to 8 were inferior to the present invention in at least any of filling property, initial discharge capacity and coulomb efficiency.

The invention claimed is:

1. Cobalt hydroxide particles used as a precursor for a positive electrode active material of a non-aqueous electrolyte secondary battery, comprising:
    spherical secondary particles of flocculated primary particles,
    wherein average aspect ratio of the secondary particles is 0.7 or more, average particle diameter is 5 to 35 μm, and a value of (d90−d10)/MV indicating a dispersion of a particle size distribution is 0.6 or less,
    wherein, in sectional observation of the secondary particles, a ratio (N/L) of number (N) of gaps with maximum long diameter 0.3 μm or more recognized in particles of the secondary particles with sectional long diameter 3 μm or more to sectional long diameter (L) of the secondary particles is 1.0 or less, and also, maximum long diameter of the gaps is 15% or less of sectional long diameter of the secondary particles.

2. The cobalt hydroxide particles according to claim 1, wherein maximum long diameter of the gaps is 2 μm or less.

3. The cobalt hydroxide particles according to claim 1, wherein average particle diameter of the secondary particles is 15 to 35 μm.

4. The cobalt hydroxide particles according to claim 1, wherein tap density is 2 to 3 g/mL.

5. A manufacturing process of cobalt hydroxide particles used as a precursor for a positive electrode active material of a non-aqueous electrolyte secondary battery, comprising:
    a nucleation step for performing nucleation by supplying a chlorine-containing cobalt salt aqueous solution, an inorganic alkali aqueous solution and an ammonium ion-containing aqueous solution into a reaction vessel of non-oxidizing atmosphere to be a reaction solution, and by controlling pH value of the reaction solution on the basis of a liquid temperature of 25° C. to be 10.5 to 12.0; and
    a particle growth step for growing particles by controlling aqueous solution for growing particles containing nuclei formed in the reaction solution in the nucleation step such that pH value on the basis of a liquid temperature of 25° C. will be 9.5 to 10.5 and also less than pH value in the nucleation step.

6. The manufacturing process of the cobalt hydroxide particles according to claim 5, wherein the chlorine-containing cobalt salt aqueous solution is configured that molar ratio of content of chlorine to content of cobalt is 1 to 3.

7. The manufacturing process of the cobalt hydroxide particles according to claim 5, wherein ammonium ion concentration of the reaction solution in the reaction vessel is controlled to 5 to 20 g/L, and temperature of the reaction solution in the reaction vessel is controlled to 30 to 50° C.

8. A positive electrode active material of a non-aqueous electrolyte secondary battery comprising lithium cobalt composite oxide particles, wherein average particle diameter of the lithium cobalt composite oxide particles is 5 to 35 μm,
    wherein, in sectional observation of the lithium cobalt composite oxide particles, a ratio (N1/L) of number (N1) of gaps with maximum long diameter 0.3 μm or more recognized in particles of the secondary particles with sectional long diameter 3 μm or more to sectional long diameter (L) of the secondary particles is 0.5 or less, a ratio (N2/L) of number (N2) of gaps with maximum long diameter 0.5 μm or more to sectional long diameter (L) of the secondary particles is 0.2 or less, and also, maximum long diameter of the gaps is 25% or less of sectional long diameter of the secondary particles.

9. A manufacturing process of a positive electrode active material of a non-aqueous electrolyte secondary battery, comprising:
    a mixing step for obtaining a lithium mixture by mixing cobalt hydroxide particles described in claim 1 with a lithium compound;
    a calcining step for obtaining a lithium cobalt composite oxide by calcining the lithium mixture in oxidizing atmosphere.

10. The manufacturing process of the positive electrode active material according to claim 9, wherein the lithium mixture is calcined at 650 to 990° C. in the calcining step.

11. The manufacturing process of the positive electrode active material according to claim 9, wherein the cobalt hydroxide particles are subjected to heat treatment in oxidizing atmosphere to be cobalt oxide particles before the mixing step.

* * * * *